(12) United States Patent
Mo et al.

(10) Patent No.: US 9,047,366 B2
(45) Date of Patent: Jun. 2, 2015

(54) METHOD AND SYSTEM FOR PROVIDING TAG INFORMATION

(75) Inventors: Sung-Wook Mo, Seoul (KR); Jae-Min Park, Seoul (KR); Myoung-Hee Seo, Seoul (KR)

(73) Assignee: KT Corporation, Seongnam-si (KR)

( * ) Notice: Subject to any disclaimer, the term of this patent is extended or adjusted under 35 U.S.C. 154(b) by 128 days.

(21) Appl. No.: 13/336,764

(22) Filed: Dec. 23, 2011

(65) Prior Publication Data

US 2012/0254232 A1 Oct. 4, 2012

(30) Foreign Application Priority Data

Mar. 28, 2011 (KR) ........................ 10-2011-0027494

(51) Int. Cl.
*G06F 17/30* (2006.01)
(52) U.S. Cl.
CPC ................................ *G06F 17/30666* (2013.01)
(58) Field of Classification Search
CPC . H04Q 2209/47; G06F 17/2276; G06F 17/30; G06F 17/30864; G06F 17/30867; G06F 17/3028; G05D 1/0274
USPC ............................... 455/1–899; 707/705–780
See application file for complete search history.

(56) References Cited

U.S. PATENT DOCUMENTS

| 7,050,991 | B2* | 5/2006 | Ogasawara ...................... 705/22 |
| 7,164,363 | B2* | 1/2007 | Kubo et al. .................... 340/692 |
| 7,894,771 | B2* | 2/2011 | Son et al. ...................... 455/41.3 |
| 8,214,357 | B2* | 7/2012 | Scott .............................. 707/726 |
| 2007/0192315 | A1* | 8/2007 | Drzaic et al. ....................... 707/5 |
| 2008/0030335 | A1* | 2/2008 | Nishida et al. ............. 340/572.1 |
| 2008/0197975 | A1* | 8/2008 | Ryoo et al. ................... 340/10.1 |
| 2009/0009626 | A1* | 1/2009 | Ko et al. ..................... 348/231.3 |
| 2009/0106279 | A1* | 4/2009 | Bae ............................... 707/100 |
| 2012/0023133 | A1* | 1/2012 | Yeon ............................. 707/770 |

FOREIGN PATENT DOCUMENTS

| KR | 10-2006-0122429 A1 | 11/2006 |
| KR | 10-0695079 B1 | 3/2007 |
| KR | 10-2009-0021956 A1 | 3/2009 |

* cited by examiner

*Primary Examiner* — Michelle Owyang
(74) *Attorney, Agent, or Firm* — Sughrue Mion, PLLC

(57) ABSTRACT

Methods and apparatuses for providing tag information. According to a method of outputting tag information in a user terminal, tag information and attribute information are obtained by reading at least one tag and then mapped to a key word and stored, and when a message content is input through a message-writing application, tag information corresponding to a key word can be extracted and displayed if the key word is included in the message content.

24 Claims, 6 Drawing Sheets

METHOD AND SYSTEM FOR PROVIDING TAG INFORMATION

CROSS-REFERENCE TO RELATED APPLICATIONS

This application claims priority under 35 U.S.C. §119(a) from Korean Patent Application No. 10-2011-0027494, filed in the Korean Intellectual Property Office on Mar. 28, 2011, the disclosure of which is incorporated herein in its entirety by reference.

BACKGROUND

1. Technical Field

Exemplary embodiments relate to methods, apparatuses and systems for effectively providing tag information.

2. Background Art

With the great advent of information technologies ("IT"), there have been efforts to create so-called ubiquitous environments, in which various IT devices can be easily and conveniently utilized in real life without being restricted to time and space. To create the ubiquitous environments, it is essential to have a wireless recognition technology that allows IT devices to remotely and effectively recognize one another, the most representative wireless recognition technologies being RFID (radio frequency identification) and NFC (near field communication).

The wireless recognition technology, which is an area of automatic recognition technologies such as bar codes, magnetic sensors and IC cards, uses very high frequency or long wave to wirelessly recognize data stored in a microchip and can recognize a tag attached to an object with a reader.

With the recent development of the RFID and the NFC technology, there has been an exponential increase in the number of objects attached with a tag, and terminals having the reader functionality can be used to easily obtain and store tag information, but it is still inconvenient to look for the stored tag information manually.

SUMMARY

One or more exemplary embodiments relates to providing tag information.

Another exemplary embodiment relates to a method, an apparatus and a system for providing relevant stored tag information to a user when the user creates or sends a message.

Another exemplary embodiment relates to a device and a system that can read at least one tag and store tag information corresponding to a key word and then search and provide the tag information corresponding to the key word included when a message is written.

Another exemplary embodiment relates to a device and a system that can search and provide the tag information corresponding to a key word included when a message content is received.

Another exemplary embodiment relates to a method that can read at least one tag and store tag information corresponding to a key word and then search and provide the tag information corresponding to the key word included when a message is written.

Other objects and advantages of the exemplary embodiments can be understood by the following description, and become apparent with reference to the exemplary embodiments. Also, it is obvious to those skilled in the art to which the exemplary embodiments pertain that the objects and advantages of the exemplary embodiments can be realized by the means as claimed and combinations thereof.

According to an aspect of an exemplary embodiment, there is provided a user terminal including: a reader configured to obtain tag information and attribute information by reading at least one tag, the attribute information including a key word; a storage unit configured to map the key word and store the tag information; an input unit configured to receive a message content; a searching unit configured to extract tag information corresponding to the key word if the key word is included in the message content; and an output unit configured to output the extracted tag information.

The output unit may include a display unit configured to display the extracted tag information in a form of a visual information.

The searching unit may analyze the message content in units of morphemes and determines whether the key word is included in the message content.

The user terminal may further include: a message generating unit configured to generate a message containing the message content; and a communication unit configured to request the generated message to be sent to another terminal, wherein the searching unit searches for the key word in the message content when the message is requested to be sent.

The user terminal may further include a control unit configured, if multiple key words are included in the message content, to control the key words to be displayed in the descending order of the number of tag information corresponding to the key words from the top of the display unit.

The attribute information may include an expiration date of the tag information.

The control unit may be configured, if multiple key words are included in the message content, to control the tag information to be displayed from an earliest expiration date of the tag information corresponding to the key words after a current date from the top of the display unit.

If N or more tag information is extracted corresponding to the key words, N being a natural number, the control unit may be configured to control tag information having the expiration date that is after the current date and before a predetermined date to be displayed through the display unit.

The control unit may be configured to delete tag information having past the expiration date from the storage unit.

According to an aspect of another exemplary embodiment, a method of outputting tag information in a user terminal is provided. The method including: obtaining tag information and attribute information by reading at least one tag, wherein the attribute information includes a key word; mapping the key word and storing the tag information; receiving a message content; extracting tag information corresponding to the key word if the key word is included in the message content; and outputting the extracted tag information.

The outputting the extracted tag information may include displaying the extracted tag information in a form of a visual information.

The extracting of the tag information corresponding to the key word may include: extracting words in units of morphemes when the message content is input; and extracting tag information corresponding to the key word if the extracted words and the key word are determined to be matched with one another.

In the displaying of the extracted tag information, the tag information of the key word having more tag information corresponded thereto may be displayed first.

The attribute information may further include an expiration date of the tag information.

In the displaying of the extracted tag information, the tag information of the key word corresponding to the tag information having an earlier expiration date is displayed first.

According to an aspect of another exemplary embodiment, there is provided a tag information providing system. The tag information providing system includes: a user terminal configured to request a message including a message content to be sent to a terminating terminal; a message center configured to send the message to the terminating terminal in response to said request and to request a key word search for the message content; and a server configured to map and store tag information and attribute information per terminal information, the attribute information including a key word, and to extract tag information corresponding to the key word and provide the tag information to the user terminal if the key word is included in the message content.

The user terminal may include a reader and is configured to obtain the tag information and the attribute information by reading at least one tag through the reader and to register the obtained tag information and attribute information along with terminal information.

If multiple key words are included in the message content, the server may be configured to extract and provide the tag information to the user terminal in the descending order of the number of tag information corresponding to the key words.

The attribute information may include an expiration date.

The server may be configured to provide the tag information to the user terminal by arranging the extracted tag information in the chronological order of the expiration date.

The server may be configured to provide the tag information to the user terminal by extracting the tag information having the expiration date that is before a predetermined date.

The server may be configured to extract and delete the tag information having past the expiration date.

According to an aspect of another exemplary embodiment, there is provided a method of outputting tag information. The method including: receiving a message content; determining if a key word is included in the message content; extracting tag information from a storage unit that stores tag information in association with a key word, the extracted tag information corresponding to the key word; and outputting the extracted tag information.

The tag information may include information obtained from a Radio Frequency Identification (RFID) tag or a Near Field Communication (NFC) tag.

The tag information may include information obtained from a tag attached to an object.

DETAILED DESCRIPTION

Exemplary embodiments will be described below in more detail with reference to the accompanying drawings. The following detailed descriptions are provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe exemplary embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
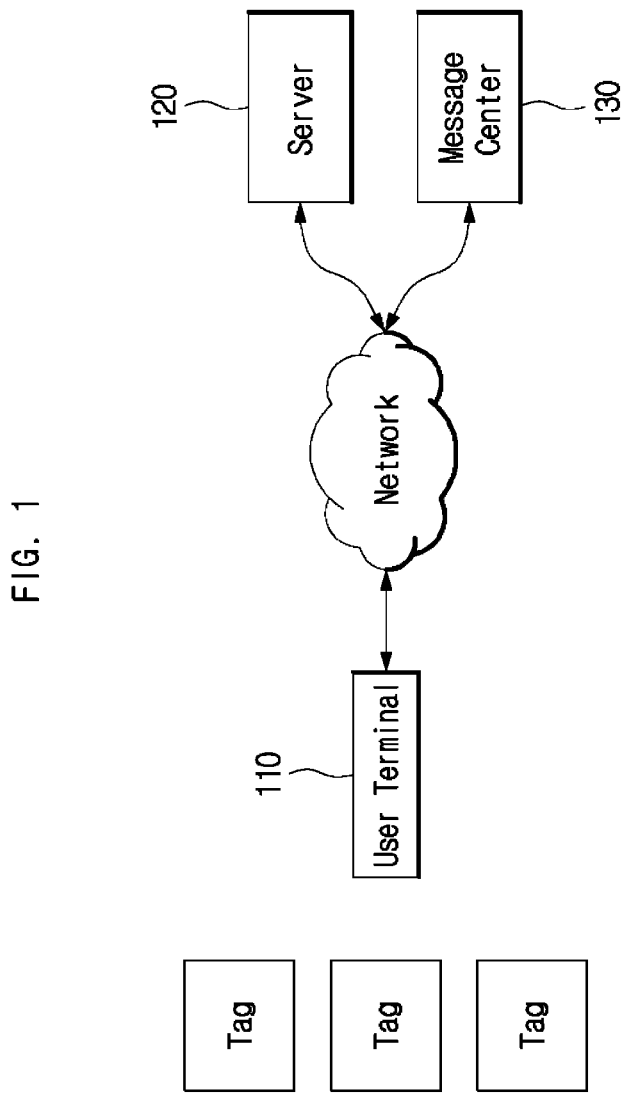
FIG. 1 is a block diagram illustrating a communication system that can provide tag information obtained by reading a tag according to an exemplary embodiment.

FIG. 1 is a block diagram illustrating a communication system that can provide tag information obtained by reading a tag.

Referring to FIG. 1, the communication system may include a user terminal 110, a server 120 and a message center 130.

The user terminal 110 may include a reader, which reads at least one tag using the reader. The reader may use high frequency or long wave to wirelessly recognize data stored in a microchip and can recognize a tag attached to an object. The tags may include bar codes, magnetic sensors or IC cards.

The user terminal 110 may obtain and store the read tag information and attribute information.

The user terminal 110 may search and provide to a user the stored tag information corresponding to the attribute information.

Here, the tag information can be URI (Uniform Resource Identifier) corresponding to the pertinent tag or service data. For example, in the case of the tag attached to a product or a movie poster, the service data can be a discount coupon for the product or movie. In another example, if the tag is attached to a product, the service data can be a gift certificate. As such, the service data can be a variety of data related to services that can be provided in connection with the product to which the tag is attached.

The attribute information can be at least one of a key word corresponding to the pertinent tag information and an expiration date of the tag information.

According to an aspect of an exemplary embodiment, searching of the tag information corresponding to the key word can be directly made in the user terminal 110 or through the server 120, which will be described later in more detail with reference to the accompanying drawing.

According to an aspect of an exemplary embodiment, the user terminal 110 can be any device that has a tag-readable reader and can be provided with a variety of services provided by a communication system. For example, the user terminal 110 can be a mobile communication terminal, a PDA, a smartphone, etc.

The server 120 may map the tag information tagged by the user terminal 110 with the key word and stores the tag information, and when the user terminal 110 requests to send a message, the server 120 may extract the tag information corresponding to the key word and send the tag information to the user terminal 110 if the key word is included in the content of the message that is requested to be sent.

Here, the server 120 can receive the message that is requested to be sent by the user terminal 110 through the message center 130, search for tag information corresponding to the key word, and provide the tag information to the user terminal 110. The server 120 may receive the message from the user terminal 110, search for the tag information corresponding to the key word, and provide the tag information to the user terminal 110.

Hereinafter, it will be described how the server 120 receives the message that is requested to be sent by the user terminal 110 through the message center 130, searches for tag information corresponding to the key word, and provides the tag information to the user terminal 110.

The message center 130 may transmit the message requested to be sent by the user terminal 110 to a terminating terminal and the server 120. For instance, the message center 130 can be one of an SMSC (Short Message Service Center), an LMSC (Long Message Service Center) and an MMSC (Multimedia Message Service Center).

Figure 2:
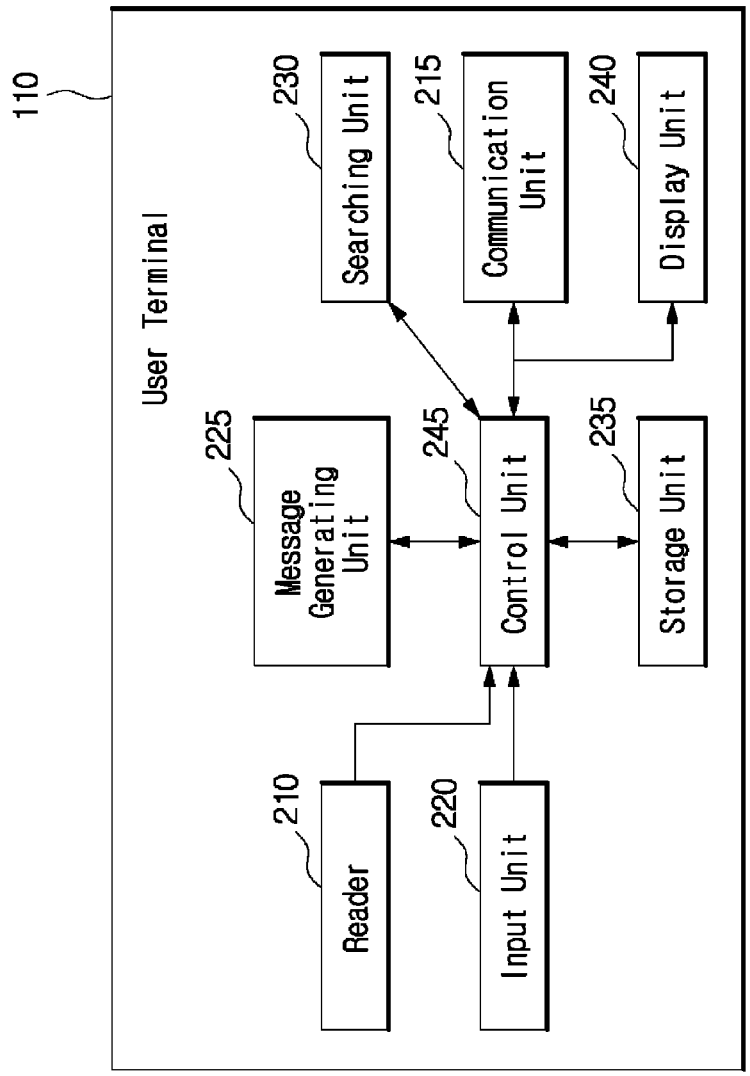
FIG. 2 is a block diagram illustrating a user terminal that searches and provides stored tag information according to an exemplary embodiment.

FIG. 2 is a block diagram illustrating the user terminal that searches for and provides the stored tag information. In FIG. 2, it will be described that the user terminal 110 searches for and displays tag information corresponding to the key word in the pre-stored tag information.

Referring to FIG. 2, the user terminal 110 may include a reader 210, a communication unit 215, an input unit 220, a message generating unit 225, a searching unit 230, a storage unit 235, a display unit 240 and a control unit 245.

The reader 210 may be operated by the control of the control unit 245 to read a tag, obtain the tag information and attribute information and output the tag information and attribute information to the control unit 245. As described earlier, the attribute information can include at least one of the key word and expiration date. Here, the key word can be a word or symbol that is related to the tag information. It is possible that the key word is obtained through reading the tag or that the key word is input by the user and mapped to the tag information and stored.

The communication unit 215 sends and/or receives data to and from other devices (e.g., the server 120, the message center 130, or other terminal devices) through a communication network.

The input unit 220 inputs with a control command for controlling the operation of the user terminal 110 and a control command for operating an application. For example, the input unit 220 can be realized with a plurality of key buttons (e.g., alphanumeric keys and * and # keys) and one or more function keys (e.g., menu key(s), a CALL key, an OK key, a RUN key, etc.), a touch screen, microphone or other input devices that can be used for inputting information.

The message generating unit 225 generates a message that includes the message content input through the input unit 220 in accordance with a pre-determined message format. Here, the message format can be any one of a short message, a long message and a multimedia message.

The searching unit 230 analyzes the input message content in units of morphemes and, if a key word is included, extracts the tag information stored in the storage unit 235 in accordance with the key word.

According to another exemplary embodiment, the searching unit 230 may analyze a message content received from another device in units of morphemes and, if a key word is included, extracts the tag information stored in the storage unit 235 in accordance with the key word.

For example, if the message content is "how about a movie today at the mall?" the searching unit 230 can extract the words "movie," "today" and "mall," which correspond to the morphemes, and, if a key word is included in the extracted morphemes, extract service information corresponding to the key word from the storage unit 235.

The storage unit 235 stores various applications required for the operation of the user terminal 110. The storage unit 235 also maps and stores the key word, which is obtained through the reader 210, and the tag information in accordance with the control of the control unit 245. Here, the storage unit 235 can store the expiration date of the tag information along with the tag information.

The display unit 240 displays data stored in the user terminal 110 or data input through the input unit 220 by the control of the control unit 245 as visual information. The display unit 240 can be a liquid crystal display (LCD).

The control unit 245 may control internal components (e.g., the reader 210, the communication unit 215, the input unit 220, the message generating unit 225, the searching unit 230, the storage unit 235, the display unit 240, etc.) of the user terminal 110.

The control unit 245 can also allow the tag information extracted in correspondence with the key word through the searching unit 230 to be output through the display unit 240.

The extracted tag information may be output via audio devices (i.e., speakers) or via other output devices.

Here, if multiple key words are extracted through the searching unit 230, the control unit 245 can control the key words to be arranged and displayed in the descending order of the number of tag information corresponding to the key words from the top of the display unit 240. The control unit 245 may control the key words to be arranged and displayed in the ascending order of the number of tag information corresponding to the key words from the top of the display unit 240

Moreover, if multiple key words are extracted through the searching unit 230, the control unit 245 can control the key words to be arranged and displayed in the order of expiration dates of tag information corresponding to the key words from the top of the display unit 240. This can be applied in the same fashion even if there is only one key word and a plurality of tag information.

Furthermore, if the number of tag information corresponding to each key word extracted through the searching unit 230 is N or more, N being a natural number, the control unit 245 can select the tag information having the expiration date before a predetermined date and display the tag information on the display unit 240. Here, the control unit 245 can select the tag information having the expiration date before the predetermined date among only the tag information for the key word having N or more tag information. In other words, if there is less than N tag information for a particular key word, the pertinent tag information may not be excluded in the selection process even though the expiration date is not before the predetermined date.

Moreover, it is possible that the control unit 245 selects and deletes the tag information having the expiration date that is past the current date among the tag information stored in the storage unit 235.

Also, it is possible that the control unit 245 extracts the tag information having the expiration date that is after the current date and before a predetermined date among the tag information stored in the storage unit 235 and displays the tag information in an audio-visual form.

Figure 3:
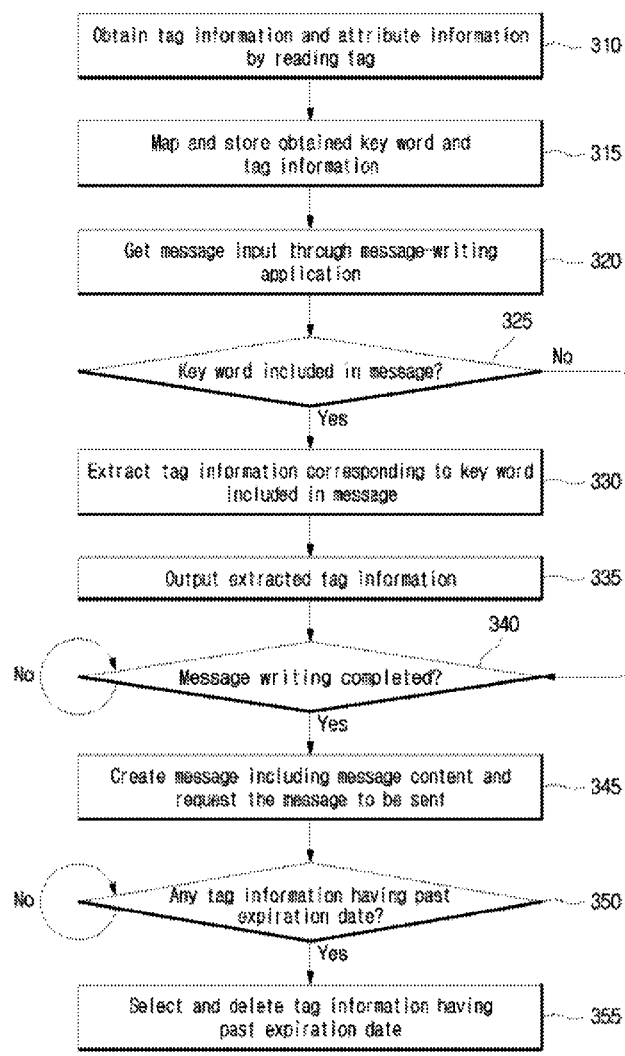
FIG. 3 is a flow diagram illustrating a method for providing the tag information by the user terminal according to an exemplary embodiment.

FIG. 3 is a flow diagram illustrating a method for providing the tag information according to an exemplary embodiment. Referring to FIG. 3, the following exemplary embodiment the following description describe a method for searching and displaying the tag information in the user terminal. Although the operations described hereinafter are carried out by the respective components of the user terminal, these components will be collectively referred to as the user terminal, for the convenience of description and understanding.

In operation 310, the user terminal 110 reads at least one tag, using the encompassed reader, and obtains the tag information and the attribute information. As described earlier, the attribute information can include at least one of the key word and the expiration date.

In operation 315, the user terminal 110 maps the tag information to the key word and stores the tag information. Here, the user terminal 110 can store the attribute information (i.e., expiration date) of the pertinent tag information along with the tag information.

The operations 310 and 315 can be repeated a number of times.

Accordingly, the following operations can be performed while a plurality of key words and tag information are mapped and stored in the user terminal 110.

In operation 320, the user terminal 110 may launch a message-writing application in response to a selection of the user and is input with the message content through the message-writing application.

In operation 325, the user terminal 110 analyzes the message content in units of morphemes and determines whether the stored key word is included in the message content.

Specifically, after the message content is completely input, the user terminal 110 can extract words by analyzing the message content in units of morphemes and determine whether each extracted word matches with the stored key words to determine whether the key words are included in the message content.

In another example, the user terminal 110 can determine whether the key words are included in the message content by determining whether the key word matching a particular word is included, when the message content is input, that is, when the words are being input in units of morphemes.

By repeating this operation, it becomes possible for the user terminal 110 to extract a plurality of key words included in the message content.

If the key word is included in the message content, in operation 330, the user terminal 110 extracts the tag information corresponding to the key word.

Then in operation 335, the user terminal 110 provides the extracted tag information to the user by displaying the tag information on the user terminal 110 in the form of audio-visual information.

The method of displaying the tag information on the user terminal 110 has been already described with reference to FIG. 2, and thus the description thereof will be omitted.

In operation 340, the user terminal 110 determines whether the message is completely written.

If the message writing is completed, in operation 345, the user terminal 110 creates a message including the message content and requests the message to be sent to the terminating terminal.

If, however, the message writing is not completed, the process stands by in operation 340.

Afterwards, in operation 350, the user terminal 110 determines whether there is any tag information having the expiration date that is past the current date.

If there is any tag information having past the expiration date, in operation 355, the user terminal 110 selects and deletes the tag information having past the expiration date.

Figure 4:
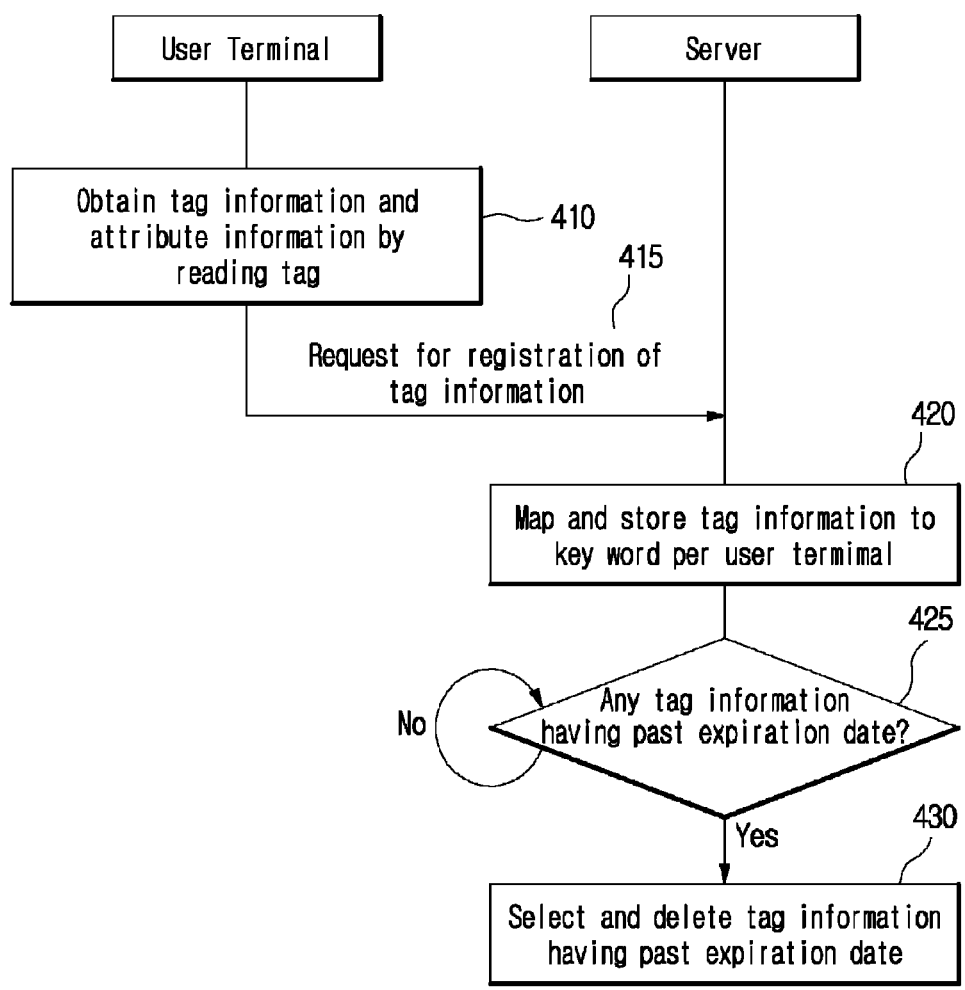
FIG. 4 is a flow diagram illustrating a method for registering the tag information in a server by user terminal according to an exemplary embodiment.

FIG. 4 is a flow diagram illustrating a method for registering the tag information in a server by user terminal according to an exemplary embodiment.

In operation 410, the user terminal 110 reads at least one tag and obtains the tag information and the attribute information. As described earlier, the attribute information can be at least one of the key word and the expiration date.

In operation 415, the user terminal 110 sends a request for registration of the tag information including the obtained tag information and attribute information as well as terminal information to the server 120.

Here, the terminal information can be identification information for identifying the user terminal 110, for example, a telephone number. Although it is illustrated in FIG. 4 that the user terminal 110 sends the request for registration of the tag information by including the terminal information, it may be possible that user information (e.g., at least one of ID and password, a social security number, etc.) is included in addition to the terminal information. That is, any information with which the user terminal 110 or the user can be identified can be equally utilized for the terminal information included in the request for registration of the tag information.

In operation 420, the server 120 maps the tag information to the key word per terminal information and stores the tag information, in response to the request for registration of the tag information from the user terminal 110. It is possible that the tag information includes the expiration date of the attribute information.

Accordingly, the user terminal 110 can register the tag information obtained by reading the tag and its related attribute information in the separate server 120.

In operation 425, the server 120 determines whether there is any tag information having past the expiration date.

If there is any tag information having past the expiration date, in operation 430, the server 120 selects and deletes the tag information having past the expiration date.

Figure 5:
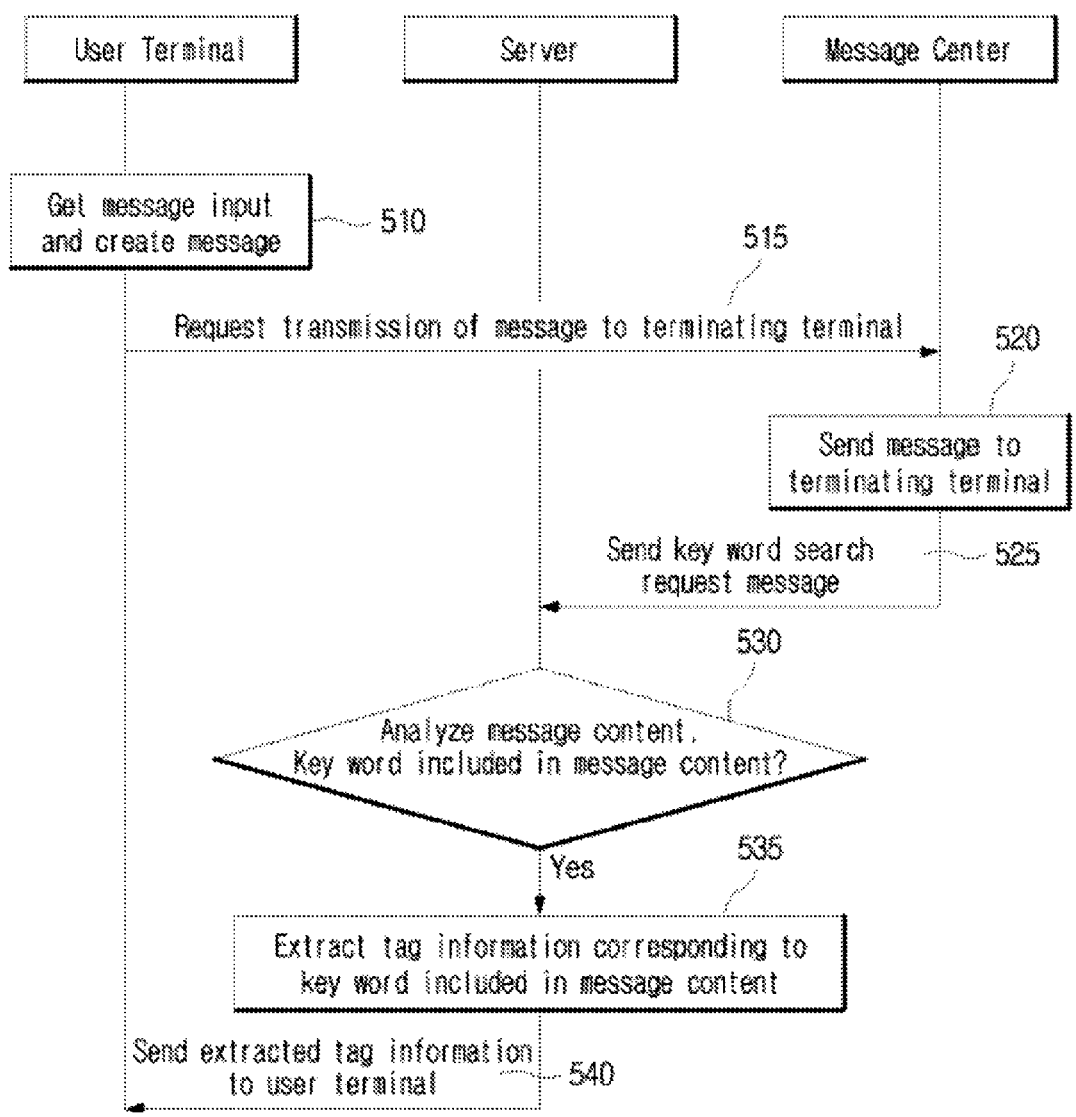
FIG. 5 is a flow diagram illustrating a method of providing tag information to the user terminal by a tag information providing system according to an exemplary embodiment.

FIG. 5 is a flow diagram illustrating a method of providing tag information to the user terminal by a tag information providing system according to an exemplary embodiment.

In operation 510, the user terminal 110 launches the message-writing application in response to selection of the user, inputs message content through the message-writing application, and creates a message including the message content.

In operation 515, the user terminal 110 transmits the message including the message content to the message center 130 so that the message can be sent to the terminating terminal.

In operation 520, once the message is received, the message center 130 transmits the pertinent message to the terminating terminal.

Then in operation 525, the message center 130 sends a key word search request message, which includes the message content and origination information, to the server 120.

Accordingly, in operation 530, the server 120 checks whether the key word is included in the message content, using the origination information. Here, the origination information can be terminal information. If the key word and tag information are mapped and stored per user information in the server 120, it shall be appreciated that the origination information included in the key word search request message can be the user information.

If the key word is included in the message content, in operation 535, the server 120 extracts the tag information corresponding to the key word.

Then in operation 540, the server 120 transmits the extracted tag information to the user terminal 110.

Here, if a plurality of key words are extracted, the server 120 can send the tag information to the user terminal 110 by arranging the tag information in the ascending or descending order of the number of tag information corresponding to the key word, prior to sending the extracted tag information to the user terminal 110.

Moreover, if the number of tag information corresponding to the extracted key word is N, N being a natural number, the server 120 can provide the tag information to the user terminal 110 by arranging the tag information in the order of expiration dates.

It is also possible that the server 120 selects and provides to the user terminal 110 the tag information having the expiration date before a predetermined date.

Figure 6:
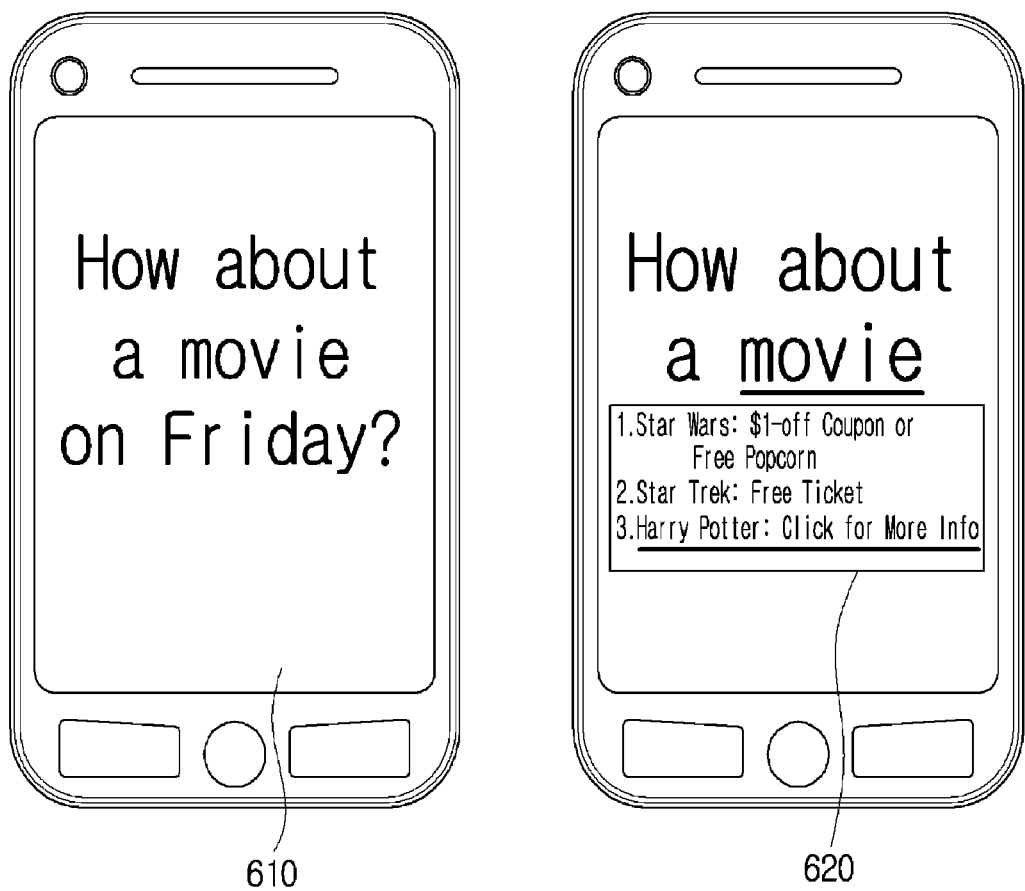
FIG. 6 shows an illustration of the tag information displayed on the user terminal according to an exemplary embodiment.

FIG. 6 shows an illustration of the tag information displayed on the user terminal according to an exemplary embodiment.

FIG. 6 illustrates a screen view 610 that shows that the user has launched the message-writing application installed in the user terminal 110 and created a message by inputting the message content.

The user terminal 110 checks whether a key word stored in the user terminal 110 is included in the created message (i.e., the message content) and extracts at least one key word included in the message content. Then, the user terminal 110 can extract tag information corresponding to the key word and output the pertinent tag information as illustrated by 620 in FIG. 6.

As described already with reference to FIG. 5, it is possible that, once the user terminal 110 sends the message, the tag information corresponding to the key word is extracted through the communication system and provided to the user terminal 110. Although FIG. 5 provides an exemplary illustration in which the user reads the tag and registers the tag information mapped with the key word in the server 120, it would be also possible that the tag information corresponding to the key word provided by a communication service provider is selected and provided to the user terminal 110, without registering the tag information per user terminal.

A method of one or more exemplary embodiments may be recorded as computer-readable program codes in non-transitory computer-readable media (CD ROM, random access memory (RAM), read-only memory (ROM), floppy disks, hard disks, magneto-optical disks, and the like) including program instructions to implement various operations embodied by a computer.

The above hardware devices of the exemplary embodiments, for example, user terminal 110, server 120, message center 130, may include a bus coupled to every unit of the device, at least one processor (e.g. central processing unit, microprocessor, etc.) that is connected to the bus for controlling the operation of the device to implement that above-described functions and executing commands, and a memory connected to the bus to store the commands, received messages, and generated messages.

Although this specification has been described above with respect to the exemplary embodiments, it shall be appreciated that there can be a variety of permutations and modifications of the described exemplary features by those who are ordinarily skilled in the art without departing from the technical ideas and scope of the features, which shall be defined by the appended claims.

While this specification contains many features, the features should not be construed as limitations on the scope of the disclosure or of the appended claims. Certain features described in the context of separate exemplary embodiments can also be implemented in combination. Conversely, various features described in the context of a single exemplary embodiment can also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under any environment. Also, it should be understood that all exemplary embodiments do not require the distinction of various system components made in this description. The program components and systems may be generally implemented as a single software product or multiple software product packages.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A user terminal comprising:
at least one hardware processor;
a reader configured to obtain tag information and attribute information by reading at least one tag, the attribute information including a key word;
a storage, after obtaining the tag information from the reader, generating keyword-mapped tag information by mapping the key word on the tag information obtained from the reader, and storing the keyword-mapped tag information;
an input unit configured to receive a message content;
a searching unit configured to search the storage after the keyword-mapped tag information is stored in the storage, and extract the keyword-mapped tag information stored in the storage corresponding to the key word if the key word is included in the message content; and
an output unit configured to output the extracted keyword-mapped tag information,
wherein at least one of the reader and the searching unit are embodied on the at least one hardware processor.

2. The user terminal of claim 1, wherein the output unit comprises a display unit configured to display the extracted keyword-mapped tag information in a form of a visual information.

3. The user terminal of claim 1, wherein the searching unit analyzes the message content in units of morphemes and determines whether the key word is included in the message content.

4. The user terminal of claim 1, further comprising:
a message generating unit configured to generate a message containing the message content; and
a communication unit configured to request the generated message to be sent to another terminal,
wherein the searching unit searches for the key word in the message content when the generated message is requested to be sent.

5. The user terminal of claim 2, further comprising a control unit configured, if multiple key words are included in the message content, to control the key words to be displayed in descending order of a number of tag information corresponding to the key words from the top of the display unit.

6. The user terminal of claim 2, wherein the attribute information further comprises an expiration date of the tag information, and further comprising a control unit configured, if multiple key words are included in the message content, to control the tag information to be displayed from an earliest expiration date of the tag information corresponding to the key words after a current date from the top of the display unit.

7. The user terminal of claim 6, wherein, if N or more tag information is extracted corresponding to the key words, N being a natural number, the control unit is configured to control tag information having the expiration date that is after a current date and before a predetermined date to be displayed through the display unit.

8. The user terminal of claim 6, wherein the control unit is configured to delete tag information having past the expiration date from the storage a.

9. The user terminal of claim 1, wherein the tag information that is obtained is stored in association with identification information of a requestor that requests storage of the tag information.

10. The user terminal of claim 1, wherein the user terminal transmits a registration request to register the tag information obtained by the reader in association with identification information of the user terminal or identification information of a user of the user terminal.

11. The user terminal of claim 1, wherein the searching unit extracts the keyword-mapped tag information corresponding to the keyword by determining if the keyword and the keyword-mapped tag information are mapped and stored in association with identification information of the user terminal or identification information of a user of the user terminal.

12. A method of outputting tag information in a user terminal, the method comprising:
    obtaining tag information and attribute information by reading at least one tag, wherein the attribute information includes a key word;
    after obtaining the tag information from a reader, generating keyword-mapped tag information by mapping the key word on the tag information obtained from the reader;
    storing the keyword-mapped tag information in a storage;
    receiving a message content;
    searching the storage after the keyword-mapped tag information is stored in the storage, and extracting the keyword-mapped tag information stored in the storage corresponding to the key word if the key word is included in the message content; and
    outputting the extracted keyword-mapped tag information.

13. The method of claim 12, wherein the outputting the extracted keyword-mapped tag information comprises displaying the extracted keyword-mapped tag information in a form of a visual information.

14. The method of claim 12, wherein the extracting of the keyword-mapped tag information corresponding to the key word comprises:
    extracting words in units of morphemes when the message content is input; and
    extracting the keyword-mapped tag information corresponding to the key word if the extracted words and the key word are determined to be matched with one another.

15. The method of claim 13, wherein, in the displaying of the extracted keyword-mapped tag information, the tag information of the key word having more tag information corresponded thereto is displayed first.

16. The method of claim 13, wherein the attribute information further comprises an expiration date of the tag information, and
    wherein, in the displaying of the extracted tag information, the tag information of the key word corresponding to the tag information having an earlier expiration date is displayed first.

17. A tag information providing system comprising:
    a user terminal, having a processor, configured to request a message including a message content to be sent to a terminating terminal;
    a message center configured to send the message to the terminating terminal in response to said request and to request a key word search for the message content; and
    a server configured to generate keyword-mapped tag information by mapping the key word on tag information obtained from a reader, and store the keyword-mapped tag information and attribute information per terminal information in a storage, the attribute information including a key word, and to search the storage after keyword-mapped tag information is stored in the storage, and extract the keyword-mapped tag information stored in the storage corresponding to the key word and provide the tag information to the user terminal if the key word is included in the message content.

18. The tag information providing system of claim 17, wherein the user terminal comprises a reader and is configured to obtain the tag information and the attribute information by reading at least one tag through the reader and to register the tag information and attribute information that is obtained along with terminal information.

19. The tag information providing system of claim 17, wherein, if multiple key words are included in the message content, the server is configured to extract and provide the tag information to the user terminal in descending order of a number of tag information corresponding to the key words.

20. The tag information providing system of claim 19, wherein the attribute information further comprises an expiration date, and
    wherein the server is configured to provide the tag information to the user terminal by arranging the extracted tag information in chronological order of the expiration date.

21. The tag information providing system of claim 17, wherein the attribute information further comprises an expiration date of the tag information, and
    wherein the server is configured to provide the tag information to the user terminal by extracting the tag information having the expiration date that is before a predetermined date.

22. The tag information providing system of claim 21, wherein the server is configured to extract and delete the tag information having past the expiration date.

23. A method of outputting tag information, the method comprising:
    receiving a message content;
    determining if a key word is included in the message content;
    generating keyword-mapped tag information by mapping the key word on tag information obtained from a reader, and storing the keyword-mapped tag information and attribute information per terminal information in a storage,
    extracting tag information from stored in the storage corresponding to the key word; and
    outputting the extracted tag information, wherein the tag information comprises information obtained from reading a tag.

24. The method of claim 23, wherein the tag information comprises information obtained from a Radio Frequency Identification (RFID) tag or a Near Field Communication (NFC) tag.

\* \* \* \* \*